PRIVATE LINE TRANSFER SWITCHING CIRCUIT

Filed April 7, 1960 3 Sheets-Sheet 1

INVENTORS J. M. ARMSTRONG
M. C. GODDARD

BY F. A. McCorkendale

ATTORNEY

PRIVATE LINE TRANSFER SWITCHING CIRCUIT

Filed April 7, 1960 3 Sheets-Sheet 2

INVENTORS J. M. ARMSTRONG
M. C. GODDARD
BY F. R. McCorkendale
ATTORNEY

PRIVATE LINE TRANSFER SWITCHING CIRCUIT

Filed April 7, 1960 3 Sheets-Sheet 3

INVENTORS J. M. ARMSTRONG
M. C. GODDARD
BY F. A. McCorkendale
ATTORNEY 3,001,027

PRIVATE LINE TRANSFER SWITCHING CIRCUIT

James M. Armstrong, Brooklyn, N.Y., and Myron C. Goddard, Westerville, Ohio, assignors to Bell Telephone Laboratories, Incorporated, New York, N.Y., a corporation of New York Filed Apr. 7, 1960, Ser. No. 20,670
7 Claims. (Cl. 179—18)

This invention relates to a telephone switching circuit, and more particularly to a switching circuit for use in connection with a private line telephone system.

Direct telephone lines, commonly referred to as "private lines," are widely used for providing a direct connection between two private line stations. For example, such direct lines may be provided between executive offices of a firm where such offices are at separated locations, or between a Government office and the home of a Government official. A direct connection or call over the private line may be initiated simply by removal of the handset at either station.

It will be apparent from the very nature of the usual applications of private lines that any failure or temporarily unsatisfactory performance thereof may well have very serious consequences.

Accordingly, it is an object of the present invention to improve the operation of private line telephone systems.

A more specific object of the present invention is to automatically provide an alternative connecting path between two private line stations in the event the private line between said two stations should fail or become temporarily unsatisfactory.

In accordance with a specific embodiment of the present invention a switching circuit is provided which is effective upon actuation to automatically transfer a private line station from the private line to the public service automatic telephone switching system for completion of a connection to the associated private line station. This would be done, of course, in the event the private line should fail or become temporarily unsatisfactory.

A feature of the novel arrangement contemplated by the present invention is means for automatically dialing, or pulsing, the number of the private line station being called, in the event the call is being routed through the public service telephone switching system.

A further feature of the arrangement is means for delaying the start of the automatic pulsing until the presence of dial tone on the line has been recognized.

A full understanding of the arrangement contemplated by the present invention as well as an appreciation of the various advantageous features thereof may be gained from consideration of the following detailed description in connection with the accompanying drawings in which.

Figure 1:
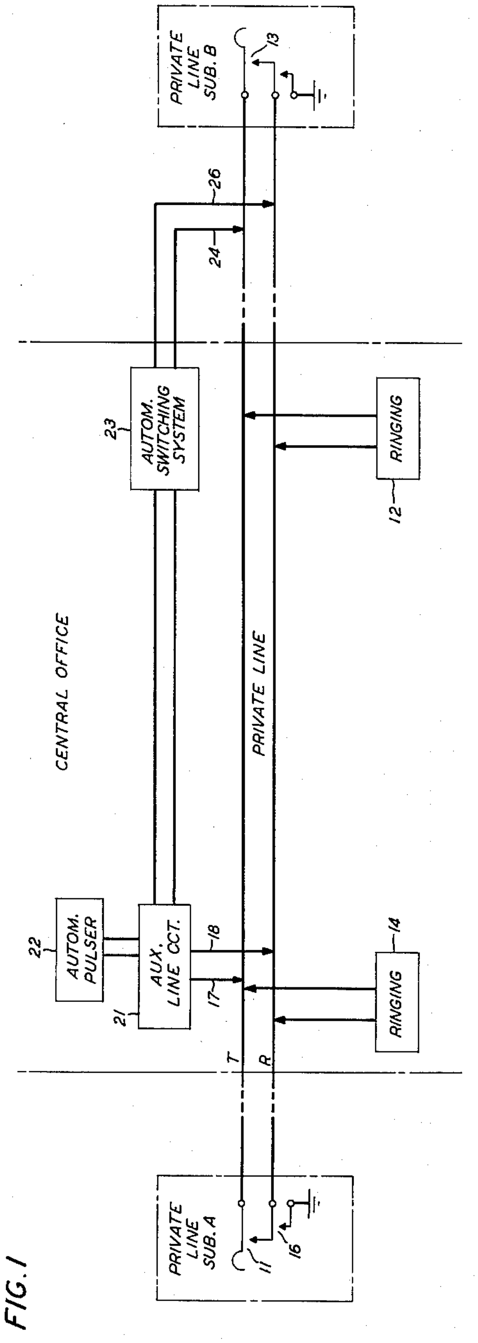
FIG. 1 shows schematically a private line telephone system which embodies features of the present invention.

Referring now to FIG. 1 and assuming that private line subscriber A wishes to call private line subscriber B, he will initiate the call by removing his handset from the cradle which results in closure of switchhook 11. This results in the operation of certain relays associated with the private line at the central office, which operations will be described in detail subsequently with reference to FIG. 2, causing the application of ringing current from source 12 to the line at the station of private line subscriber B. When subscriber B answers the call by removing his handset, which results in closure of switchhook 13, the ringing current is tripped and the subscribers may converse over the private line. When the subscribers complete their conversation and replace their handsets, switchhooks 11 and 13 are opened and the circuit is restored to normal condition.

Private line subscriber B may initiate a call to subscriber A in a similar manner, and in such case ringing current from source 14 is applied to the line at the station of private line subscriber A.

Let us assume now that subscriber A wishes to call subscriber B and, having found that the private line has failed or is operating unsatisfactorily, wishes to complete the call through the public service telephone system in the novel manner contemplated by the present invention. In this instance before removing his handset, subscriber A will momentarily close nonlocking switch 16, provided on or near his handset, which operation connects ground to the ring conductor of the line. This results in operation of certain relays provided at the central office, which operations will be described subsequently in reference to FIG. 2, causing the line of subscriber A to be switched over conductors 17 and 18, at the central office, from the private line to the auxiliary line circuit 21. An automatic pulser, or call transmitter 22 is provided in conjunction with the auxiliary line circuit, being set up with the number of the station of subscriber B alone. Pulser 22 is automatically set into operation, after awaiting the recognition of dial tone on the line, and transmits to the automatic switching system 23 pulses corresponding to the number of the station of private line subscriber B. It will be assumed for purposes of the subsequent detailed description of the invention that automatic switching system 23 is of the well-known crossbar type. It will be understood, however, that the invention may be used in conjunction with any of the many other types of automatic switching systems well known in the art. Under control of the transmitted pulses, the automatic switching system 23 completes the call over conductors 24 and 26 to the station of private line subscriber B. Ringing current is applied in the usual manner, and, when called subscriber B answers, the two private line subscribers A and B may converse over the public service telephone circuits. It will be noted, however, that the only action required by private line subscriber A in setting up the call was the momentary closing of switch 16 at his station before removal of his handset.

*Regular private line operation for outgoing call*

Figure 2:
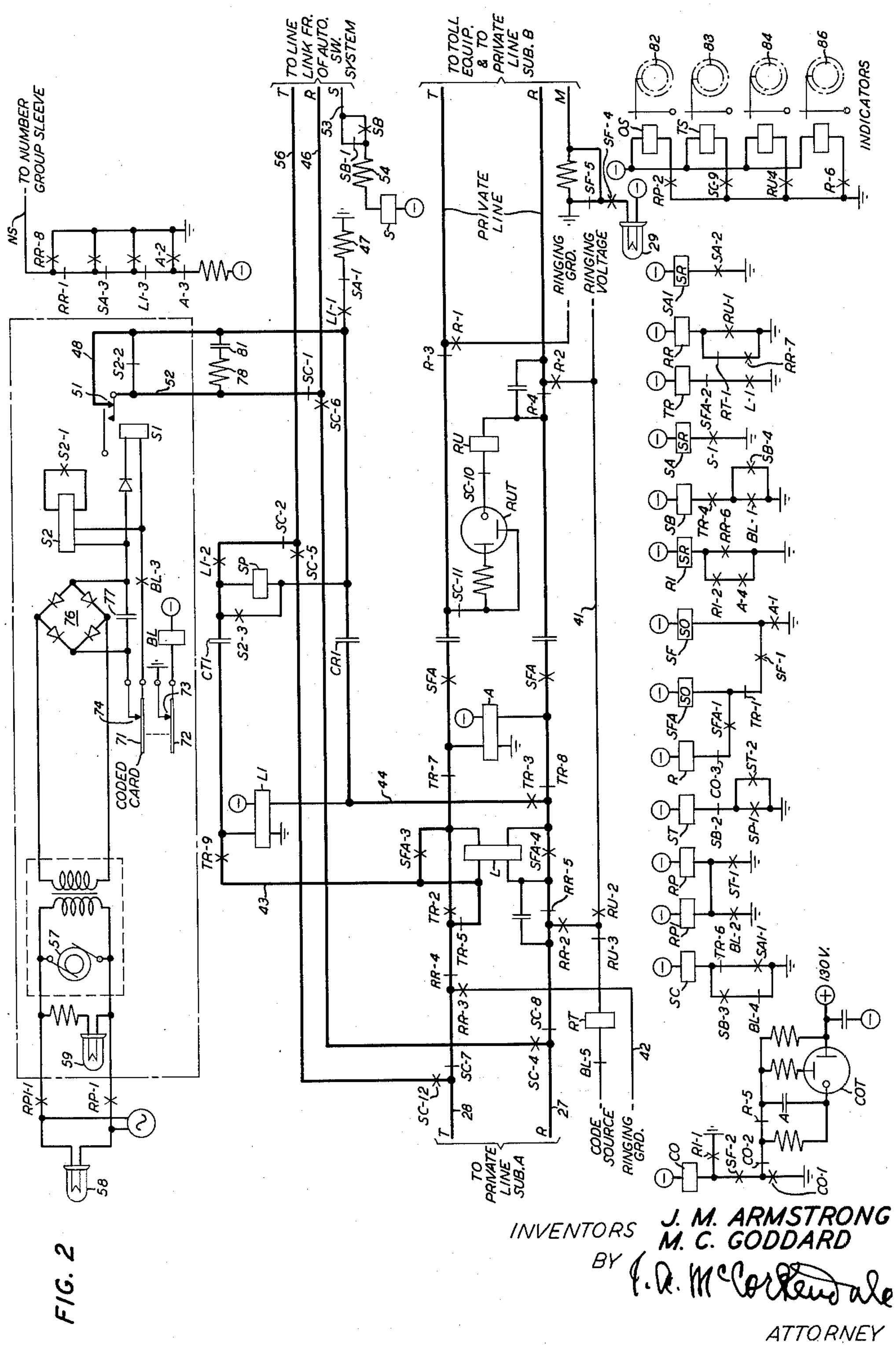
FIG. 2 shows in detail certain of the circuits utilized in the system of FIG. 1.

Coming now to a detailed description of the switching circuits utilized in the novel arrangement contemplated by the invention and referring particularly to FIG. 2, it will be assumed first that, as described above, private line subscriber A removes his handset in order to initiate a call to subscriber B over the private line which connects the two stations. When the handset is removed closing the line at the subscriber's station, the loop is closed through relay A which operates from battery, right-hand winding of relay A, ring conductor 27, lower winding of relay L, break contacts RR–5 of relay RR and SC–8 of relay SC, closed line at station of subscriber A, tip conductor, break contacts SC–7 of relay SC, RR–4 of relay RR and TR–5 of relay TR, upper winding of relay L, break contact TR–7 of relay TR, left-hand winding of relay A to ground. Relay L does not operate at this time since the two windings thereof are connected differentially.

Figure 4:
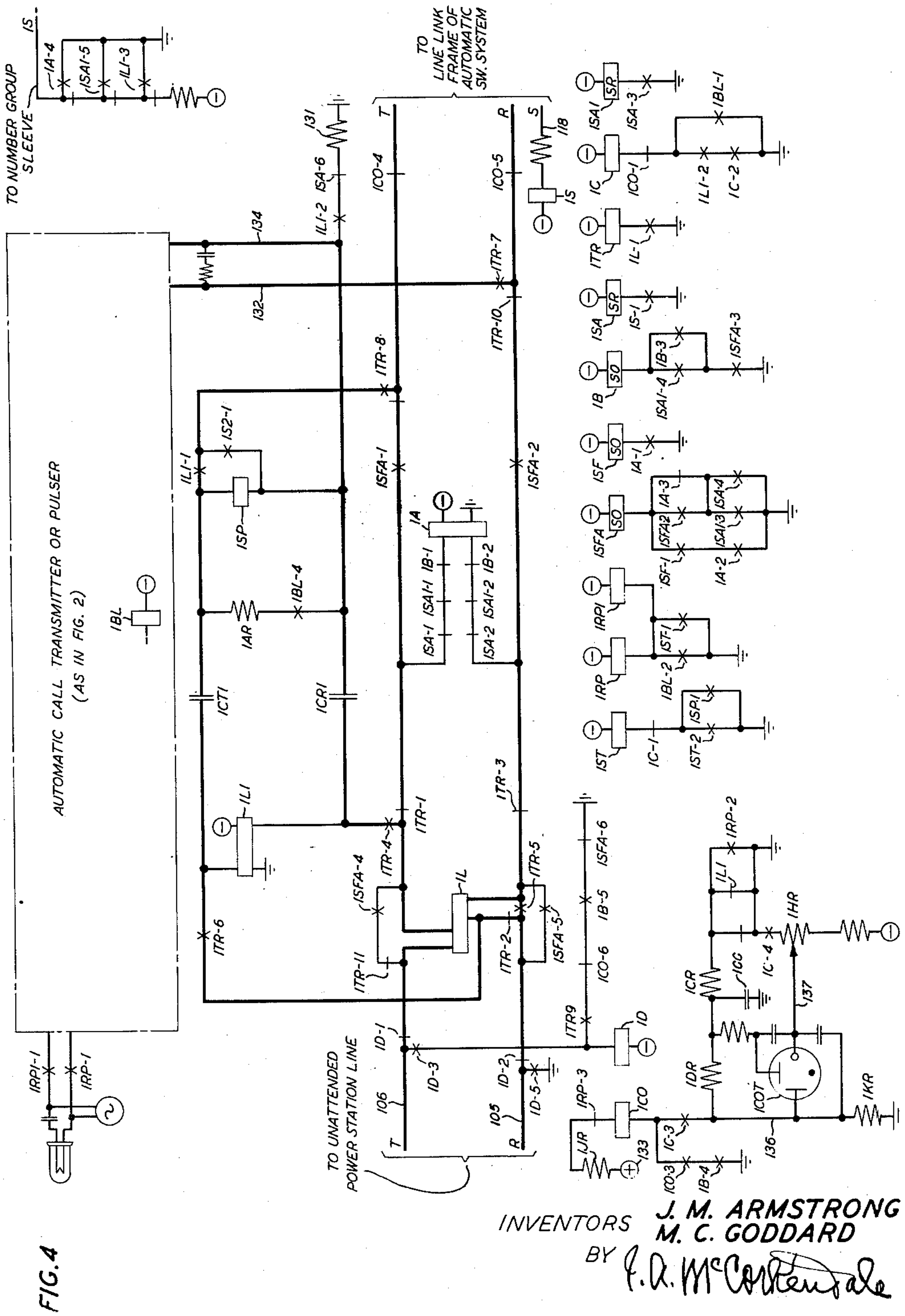
FIG. 4 shows in detail certain of the circuits utilized in the system of FIG. 3.

(It will be observed that the detailed circuit drawings of FIGS. 2 and 4 are in the now commonly used "detached contact" form and the usual practice of showing normally open, or make, contacts by the symbol X and normally closed, or break, contacts by the symbol | or – is followed.)

Operation of relay A completes an operating path for relay SF, traced from battery, winding of relay SF, make contact A–1 of relay A to ground; connects ground through its make contact A–2 and break contacts L1–3 of relay L1, SA–3 of relay SA and RR–1 of relay RR to the number group sleeve conductor NS as a busy indication, and disconnects at its break contact A–3 battery from said number group sleeve.

Relay SF, operated, completes an operating path for relay SFA traced from battery, winding of relay SFA, break contact TR–1 of relay TR, make contact SF–1 of relay SF and make contact A–1 of relay A to ground. Relay SFA, operated, completes in turn an operating path for relay R, traced from battery, winding of relay R, break contact CO–3 of relay CO, make contact SFA–1 of relay SFA, break contact TR–1 of relay TR, make contact SF–1 of relay SF and make contact A–1 of relay A to ground.

Relay R upon operating connects a ringing source to the "forward" section of tip and ring conductors 28 and 27 at make contacts R–1 and R–2 of relay R, and at the same time disconnects the "forward" section from the "rearward" section at its break contacts R–3 and R–4, so that the ringing voltage will not be transmitted back towards the calling station.

Relay R, operated, also removes at its break contact R–5 the short circuit across capacitor A, permitting the capacitor to charge to the +130-volt supply. In a relatively short time determined by the circuit characteristics, for example, two seconds, capacitor A charges to the breakdown voltage of the starter gap on gaseous tube COT, whereupon tube COT fires permitting conduction on the main gap. Relay CO now operates on conduction through tube COT and locks in operated position over a path from battery, winding of relay CO, make contact SF–2 of relay SF, make contact CO–1 to ground. At this same time the operating path of relay CO is disconnected from the COT tube circuit at break contact CO–2 of relay CO.

Relay CO, operated, opens at its CO–3 break contact the operating path for relay R, and relay R thereupon releases. Relay R released removes the ringing source from the line (make contacts R–2 and R–1) and connects, at its break contacts R–3 and R–4, the tip and ring conductors 28 and 27 through to called private line subscriber B. The windings of the L relay are shunted out of this connection by break contact TR–5 of relay TR and make contact SFA–3 of relay SFA and by make contact SFA–4 of relay SFA, respectively. The ringing voltage which was applied to the "forward" section of the line as above described is converted to the desired code in the toll equipment and transmitted to the called station. When called private line subscriber B answers, ringing is removed from his line and the talking path is complete. When the parties disconnect upon completion of the call all operated relays release restoring the circuit to normal condition.

Pilot lamp 29, together with its associated circuit which includes make contact SF–4 and break contact SF–5 of relay SF, is provided to indicate the condition on the M, signaling, line of the toll equipment.

*Regular private line operation for incoming call*

Assuming now that private line subscriber B has initiated a call over the private line to subscriber A, and referring again to FIG. 2, when the ringing voltage is received from the calling end of the line over tip and ring conductors 28 and 27, gaseous tube RUT will conduct and relay RU will operate over an obvious path including break contacts SC–11 and SC–10 of relay SC and remain operated during the duration of the ringing voltage, for example, two seconds.

Relay RU, operated, completes an operating path for relay RR traced from battery, winding of relay RR, make contact RU–1 of relay RU to ground; relay RR, upon operating, locks over a path including break contact RT–1 of relay RT and its own make contact RR–7, to ground. Relay RR, upon operating, connects ground through its RR–8 make contact to the number group sleeve conductor NS as a busy indication, and also connects ringing voltage over conductor 41 through make contact RU–2 of relay RU and make contact RR–2 of relay RR to ring conductor 27 and connects ringing ground over conductor 42 and make contact RR–3 of relay RR to tip conductor 28. At this point tip and ring conductors 28 and 27 are open at respective break contacts RR–4 and RR–5 of relay RR, preventing transmission of ringing voltage to the calling end of the line.

Relay RR, operated, also completes an operating path for relay R1, traced from battery, winding of relay R1, make contact RR–6 of relay RR to ground. Operation of relay R1 in turn partially completes a locking path through its make contact R1–2 and make contact A–4 of relay A and also completes an operating path for relay CO, traced from battery, winding of relay CO, make contact R1–1 of relay R1 to ground. So long as relay CO remains operated, the operating path of relay R is held open at break contact CO–3 of relay CO; this prevents operation of relay R with resulting application of ringing current to the calling end of the line when the called party answers.

When the ringing voltage which is applied to the calling end of the line, and which operates relay RU through gaseous tube RUT, is removed (after a period of about two seconds), relay RU releases. When relay RU releases, the ringing voltage previously supplied over conductor 41 is removed at make contact RU–2 of relay RU and code ringing is applied through break contact BL–5 of relay BL, winding of relay RT and break contact RU–3. When the called party A answers the call by removing his handset, relay RT operates on the ringing current over the loop closed at the called station. Operation of relay RT opens at its RT–1 break contact the holding path of relay RR (relay RU is released). Relay RR released, removes the ringing source from the line at its make contacts RR–2 and RR–3 and completes the talking path at its break contacts RR–4 and RR–5.

When the parties complete their conversation and restore their handsets, all relays release and the circuit is restored to normal condition.

*Auxiliary line circuit used for outgoing call through public service switching facilities*

Let us assume now for further disclosure of the invention, that private line subscriber A wishes to call the associated private line subscriber B, but, finding that the private line is not operating satisfactorily, elects to place his call through the public service switching facilities by means of the auxiliary line circuit contemplated by the present invention. In such instance, subscriber A will, as discussed above, momentarily depress the push button switch provided at his station, this being done before he removes his handset. Operation of the switch as described above in connection with FIG. 1, connects ground to ring conductor 27 thereby completing an operating path for relays A and L, traced from battery, right-hand winding of relay A, break contact TR–8 of relay TR, lower winding of relay L, to ground on ring conductor 27 at the subscriber's station.

Relay L, operated, completes an operating path for relay TR traced from battery, winding of relay TR, break contact SFA–2 of relay SFA, make contact L–1 of relay L to ground.

Relay TR, operated, reverses at its break contact TR–5 and make contact TR–2 the upper winding of relay L, changing the relay from the previous differentially wound arrangement, and transfers, at break contact TR–7 and make contact TR–9, tip 28 over conductor 43 to capacitor CT1, and transfers, at break contact TR–8 and make contact TR–3, ring 27 over conductor 44 to capacitor CR1; this releases relay A. Operation of relay TR also causes operation of relay L1 over a path from battery, right-hand winding of relay L1, make contact TR-3 of relay TR, to ground on ring 27 while the push button switch at the substation is depressed, and through the station loop when the handset is removed, and holds relay L operated over the station loop under control of the switch-hook at the station of private line subscriber A.

Relay L1, operated, connects ground over ring conductor 46 to the Line Link Frame of the automatic switching system (which, as previously stated above, is assumed for purposes of description to be of the crossbar type) as an indication that a register should be connected; this path is traced from ground, resistor 47, break contact SA-1 of relay SA, make contact L1-1 of relay L1, conductor 48, break contacts 51 of relay S1, conductor 52, break contact SC-1 of relay SC to ring conductor 46.

When a register (not shown) has been connected in the usual manner, ground is connected to the S lead 53 from the automatic switching equipment and the S relay operates over a path from the ground referred to, break contact SB-1 of relay SB, resistor 54, winding of relay S to battery. Operation of relay S completes an operating path for relay SA, traced from battery, winding of relay SA, make contact S-1 of relay S to ground. Relay SA, operated, removes ground from conductor 48 at its break contact SA-1. Relay SA, operated, also completes an operating path for relay SA1 traced from battery, winding of relay SA1, make contact SA-2 of relay SA to ground.

When the register is ready to receive pulsing, ground is connected to tip lead 56 and battery is connected to ring lead 46 from the automatic switching equipment; this operates relay SP over a path from the ground on tip conductor 56, break contact SC-2 of relay SC, make contact L1-2 of relay L1, winding of relay SP, conductor 48, break contacts 51 of relay S1, conductor 52, break contact SC-1 of relay SC to battery on ring conductor 46. At this point the auxiliary line circuit has, in effect, recognized the presence of dial tone on the line.

Relay SP, operated, completes an operating path for relay ST, traced from battery, winding of relay ST, break contact SB-2 of relay SB, make contact SP-1 of relay SP to ground, relay ST upon operating locks up over a path through its ST-2 make contact. Operation of relay ST results, in turn, in operation of relays RP and RP1 over respective paths from battery, winding of relay RP, make contact ST-1 of relay ST to ground, and from battery, winding of relay RP1, make contact ST-1 of relay ST to ground.

Operation of relays RP and RP1 closes at their respective make contacts RP-1 and RP1-1 an energizing path for the motor 57 of the automatic pulser or call transmitter circuit which is shown enclosed by the dash-dot lines. Pilot lamp 58 is provided to indicate the condition of the power supply for the automatic pulser and pilot lamp 59 is lighted when the pulser is in operation.

Automatic call transmitters of the so-called repertory type are well known in the telephone art; for example, one such device is described in United States Patent 2,100,390 issued November 30, 1937, to Mr. H. W. Goff. It is usual to provide in such devices a plurality (for example fifty) of impulse controlling, coded, cards or discs, each being punched or contoured in accordance with a different, frequently called, telephone number. The subscriber using the device merely "selects" the proper disc corresponding to the number he wishes to call and then presses a switch to start the device for automatic transmission of the selected number. As the disc is rotated by the motor-driven shaft, impulses corresponding to the number being called are transmitted.

In the modified form of automatic call transmitter which is utilized in the present arrangement and which is shown in FIG. 2, only one coded card, 71, is provided, and this is punched or contoured to correspond with the telephone number of private line subscriber B. Cam 72 is mounted to be rotated with coded card 71 and is effective to close contact 73 at the start of the rotation of the shaft and to maintain the contact closed until a complete rotation of the shaft and card has been accomplished.

Therefore, as the energizing circuit of motor 57 is closed as above described and rotation of the driving shaft for card 71 and cam 72 starts, relay BL operates over an obvious path completed through contact 73. Relay BL, operated, completes an operating path for relay SB traced from battery, winding of relay SB, make contact TR-4 of relay TR, make contact BL-1 of relay BL to ground; relay SB upon operating locks up over a path through its make contact SB-4. Operation of relay SB, in turn, interrupts at its SB-2 break contact the operating path of relay ST, which releases. Relays RP and RP1, previously operated through make contact ST-1 of relay ST, do not release at this time, being held operated over a path now completed through make contact BL-2 of relay BL.

As card 71 is rotated the associated contact 74 is open and closed in accordance with the contours on the card which, in turn, correspond to the number of private line subscriber B. The output from the full wave, bridge type rectifier 76 is filtered by capacitor 77 and when contact 74 is closed, direct current flows into the parallel combination of the pulsing unit relay S1 and the blanking relay S2; this circuit includes make contact BL-3 of relay BL. As pulsing contacts 51 are operated by pulsing relay S1, the number of called private line subscriber B is pulsed to the connected register.

Make contact S2-1 of relay S2 in effect places a short-circuited winding on pulsing relay S2, when the relay is energized in order to make the relay slow-to-release, while break contact S2-2 of the relay is connected across the pulsing contacts 51 to provide continuity should the power to the call transmitter be interrupted leaving the pulsing contacts open. Make contact S2-3 places a short across the winding of relay SP while the pulsing relay is energized. A network, comprising resistor 78 and capacitor 81, is provided to protect the pulsing contacts against sparking.

After completion of a full rotation of the shaft driven by motor 57, i.e., after the complete number has been pulsed, contact 73 opens and relay BL releases. Relay BL, released, completes an operating path for relay SC, traced from battery, winding of relay SC, make contact SB-3 of relay SB, break contact BL-4 of relay BL to ground. Operation of relay SC, connects at its make contacts SC-12 and SC-5, and SC-4 and SC-6, respectively, the tip and ring conductors from private line subscriber A directly to tip 56 and ring 46 conductors to the line link frame of the automatic switching equipment.

Release of relay BL also interrupts at its BL-2 make contact the operating paths for relays RP and RP-1, which release and stop the automatic call transmitter.

Operation of relay SC, as mentioned above, interrupts at its break contacts SC-7, SC-8 and SC-2 the operating paths for relays L, L1 and SP, all of which relays release. Relay L, released, releases at its L-1 make contact relay TR; relay TR, released, releases at its TR-4 make contact relay SB.

In connection with the normal operation of the automatic telephone switching equipment, the register disconnects from the line at this time, removing ground from S lead 53 and releasing relay S. Relay S, released, interrupts at its make contact S-1 the operating path of relay SA. Relay SA does not release at this point, however, since it is slow-to-release as is relay SA1. These slow-to-release characteristics are provided so that the holding path of relay SC, which includes make contact SA1-1 of relay SA1, will not be interrupted until the marker has established a connection for this circuit.

Further in connection with the normal operation of the automatic telephone switching equipment, the register passes the called number to the marker so that the call can be completed through the public service switching facilities to called private line subscriber B. When the marker has established linkages to station B, directly if in the same central office, or through an outgoing trunk circuit if in a distant office, ground is again connected to S lead 53 and relay S is again operated. Relay S, operated, reestablishes at its make contact S-1 the operating path for relay SA; this in turn results in holding relays SA1 and SC operated. Relays S, SA, SA1 and SC remain operated for the duration of the call; when the call is completed and both parties disconnect, all relays release and the circuit restores to normal.

*Auxiliary line circuit used for incoming call from public service switching facilities*

Assuming now that the auxiliary line circuit is seized by an incoming call through the automatic switching equipment of the public service facilities, ground will be connected to S lead 53 through normal operation at the line link frame and relay S will operate.

Relay S, operated, completes an operating path for relay SA through its S-1 make contact, and relay SA, operated, in turn completes an operating path for relay SA1 through its SA-2 make contact. Relay SA1 upon operating completes an operating path for relay SC, traced from battery, break contact TR-6 of relay TR, make contact SA1-1 of relay SA1 to ground.

Operation of relay SC, opens tip 28 and ring 27 at its break contacts SC-7 and SC-8, respectively, and connects the tip and ring of called private line subscriber A through its make contacts SC-12 and SC-5 and its make contacts SC-4 and SC-6, respectively over tip 56 and ring 46 directly to the line link frame of the public service automatic switching system.

Ringing and supervisory signals are controlled by the connected trunk, and the called private line in this case is the same, so far as the automatic switching equipment is concerned, as any other dial subscriber to whom an incoming call is to be completed. When the call has been completed and the called line disconnects all relays release and the circuit restores to normal.

Indicators 82, 83, 84 and 86 are provided in order to record the number of outgoing and incoming calls for both the regular private line and the supplementary or auxiliary channel.

Indicator 86, operating through make contact R6 of relay R, operates once for each outgoing call through the regular private line channel. Indicator 84, operating through make contact RU-4 of relay RU, is operated once on each incoming call through the regular private line channel. Indicator 82, operated through make contact RP-2 of relay RP is operated once on each outgoing call through the supplementary channel. Indicator 83, operating through make contact SC-9 of relay SC, is operated once on both outgoing and incoming calls through the supplementary channel.

Figure 3:
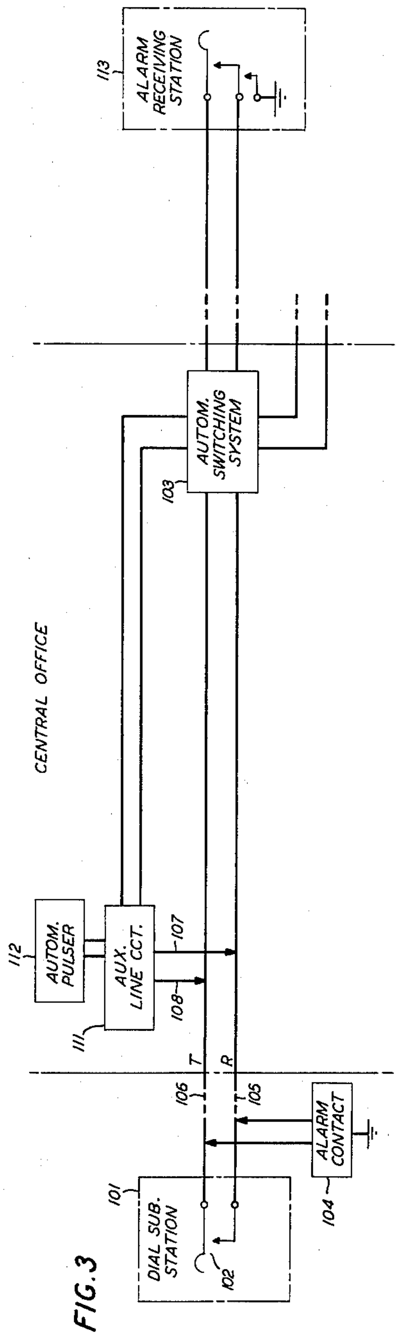
FIG. 3 shows schematically an alarm signaling system which embodies features of the present invention.

Referring now to FIG. 3 there is shown schematically an arrangement wherein the auxiliary line circuit contemplated by the invention is utilized in connection with an alarm transmitting system. It will be assumed that dial subscriber's station 101 is located at a premise, which is at times unattended, and at which are provided alarm signaling means for indicating conditions of trouble at the substation.

The line at station 101 is closed by switch 102 when the handset is removed, and calls may be made through the automatic switching system 103 at the central office and received therefrom in the usual manner. It will be assumed for purposes of detailed description subsequently that the automatic switching system is of the crossbar type, now well known in the art, but it will be understood that the invention is applicable as well in connection with other types of automatic telephone switching systems.

Upon occurrence of a trouble condition, alarm contact 104, which may be any one of many well-known types depending upon the type of abnormal condition to be reported, operates to connect ground to tip 106 and ring 105 of the line. This causes operation of certain relays at the central office, as will be described in detail subsequently with reference to FIG. 4, which is effective to transfer the line of station 101 over conductors 107 and 108 to auxiliary line circuit 111. Automatic pulser 112 is provided at the central office and is set up to transmit only the number of alarm receiving stations 113.

The auxiliary line circuit 111 when activated, as above, transmits a seizure signal to the automatic switching system 103, awaits dial tone, and then automatic pulser 112 is set into operation to pulse the number of alarm receiving station 113 into the automatic switching equipment. The automatic switching equipment operates in its normal manner to connect the auxiliary line circuit and the calling line to the alarm receiving station 113. A code ringing signal is then sent over the line to indicate the presence of trouble condition at station 101.

*Regular operation for outgoing call*

Reference will now be made to FIG. 4 for a detailed description of the auxiliary line circuit contemplated by the present invention as applied in connection with an alarm transmitting system; it will be assumed first that the subscriber at the dial subscriber's station 101 (FIG. 3) wishes to initiate an outgoing call in the normal fashion. When the subscriber removes his handset, the tip lead 106 and ring lead 105 are connected at the substation and relay 1A operates over a path from battery, upper winding of relay 1A, break contact 1B-1 of relay 1B, break contact 1SA1-1 of relay 1SA1, break contact 1SA-1 of relay 1SA, break contact 1TR-1 of relay 1TR, left-hand winding of relay 1L, break contact 1D-1 of relay 1D, substation loop connecting tip 106 and ring 105, break contact 1D-2 of relay 1D, break contact 1TR-2 of relay 1TR, right-hand winding of relay 1L, break contact 1TR-3 of relay 1TR, break contact 1SA-2 of relay 1SA, break contact 1SA1-2 of relay 1SA1, break contact 1B-2 of relay 1B, lower winding of relay 1A to ground.

Relay 1L does not operate at this time since its windings are connected differentially.

Relay 1A, operated, connects ground through its 1A-4 make contact to the number group sleeve condrctor 1S. as a busy indication (parallel paths being open at make contacts 1SA1-5 of relay 1SA1 and 1L1-3 of relay 1L1), and completes an operating path for relay 1SF, traced from battery, winding of relay 1SF, make contact 1A-1 of relay 1A to ground. Operation of relay 1SF completes, in turn, an operating path for relay 1SFA, traced from battery, winding of relay 1SFA, make contact 1SF-1 of relay 1SF, make contact 1A-2 of relay 1A to ground. Operation of relay 1SFA connects, at its 1SFA-1 and 1SFA-2 make contacts, respectively, tip 106 and ring 105 on through to the line link frame of the automatic switching system, which, as stated above, will be assumed for purposes of description to be of the crossbar type.

Ground connected through the lower winding of relay 1A over the ring conductor and through break contacts 1TR-10 of relay 1TR and 1CO-5 of relay 1CO to the line link frame causes an originating register to be connected in the usual manner to the auxiliary line circuit. When the register has been connected, ground is returned over S lead 118, operating relay 1S. When the register is ready to receive pulsing, dial tone is connected to tip 106 and ring 105 from the automatic switching equipment in the usual manner, thus indicating to the calling subscriber at station 101 that he may start dialing.

Relay 1S, operated, completes an operating path for relay 1SA over a path traced from battery, winding of relay 1SA, make contact 1S–1 of relay 1S to ground. Relay 1SA, operated, opens at its 1SA–2 break contact the operating path of relay 1A, which releases. Release of relay 1A, in turn, interrupts at its 1A–1 make contact the operating path for relay 1SF, which releases. Relay 1SFA does not release at this point, however, being held over a path to ground which includes its own make contact 1CFA–2 and make contact 1SA–4 of relay 1SA.

Operation of relay 1SA also completes an operating path for relay 1SA1 traced from battery, winding of relay 1SA1, make contact 1SA–3 of relay 1SA, to ground. Relay 1SA1 upon operating completes an operating path for relay 1B, traced from battery, winding of relay 1B, make contact 1SA1–4 of relay 1SA1, make contact 1SFA–3 of relay 1SFA to ground. Relay 1SA1 operated, with relay 1A released, holds relay 1SFA operated over a path from battery, winding of relay 1SFA, break contact 1A–3 of relay 1A, make contact 1SA1–3 of relay 1SA1 to ground.

After dialing has been completed, the originating register of the automatic switching system disconnects in the usual manner from the auxiliary line circuit and passes the called number to the marker for completion of the call. When the register disconnects, ground is removed from the S lead 118 and relay 1S releases.

Relay 1S upon releasing opens at its 1S–1 make contact the operating path of relay 1SA, which releases. The operating path for relay 1SA1 includes make contact 1SA–3 of relay 1SA, but since both relays 1SA and 1SA1 are slow-to-release, relay 1SFA, the present holding path of which includes its own make contact 1SFA–2 and make contact 1SA1–3 of relay 1SA1, is held operated for a time sufficient to permit the marker to connect a trunk to the auxiliary line circuit for completion of the call to the called line. When the marker connects a trunk to the auxiliary line circuit, relay 1S reoperates which operates relay 1SA (if released) to hold relay 1SA1 operated. Ringing is then applied to the called line by the connected trunk; when the called party answers, ringing is tripped and conversation may proceed.

In the event the calling end (station 101) releases first the tip and ring leads 106 and 105 to the connected trunk are opened at the substation, causing the trunk to release. When the connected trunk releases, ground is removed from the S lead 118, and relay 1S releases; relay 1S, released, releases relay 1SA, which, in turn, releases relay 1SA1. Relay 1SA1, upon releasing, opens at its 1SA1–3 make contact the holding path for relay 1SFA which thereupon releases. When relay 1SFA releases, the holding path for relay 1B (which now includes its make contact 1B–3) is interrupted at make contact 1SFA–3 and relay B releases and the auxiliary line circuit restores to normal.

In the event the called party releases first, the connected trunk releases, removing ground from S lead 118 to the auxiliary line circuit; the circuit then restores to normal as above described.

*Regular operation for incoming call*

Assuming now that there is an incoming call from the automatic switching system to dial substation 101, the marker connects a trunk to the auxiliary line circuit and relay 1S operates from ground on the S lead 118. Relay 1S operated, operates relay 1SA through make contact 1S–1 of relay 1S; relay 1SA, upon operating, disconnects at its break contacts 1SA–2 and 1SA–1 the windings of relay 1A from tip 106 and ring 105. Relay 1SA, operated, also completes operating paths in turn for relay 1SA1 (make contact 1SA–3 of relay 1SA) and for relay 1SFA (break contact 1A–3 of relay 1A and make contact 1SA–4 of relay 1SA); relay 1SFA, operated, completes at its make contacts 1SFA–1 and 1SFA–4 and its make contacts 1SFA–2 and 1SFA–5, respectively, a direct transmission path for the connected trunk through to called station 101. Operation of relay 1B follows operation of relay 1SA1, relay 1SFA having previously operated. Ringing is then applied to the called line by the connected trunk; when the called party answers, ringing is tripped and the conversation may proceed.

When either end releases, ground is removed from the S lead 118 by the connected trunk, releasing relay 1S; relays 1SA, 1SA1, 1SFA and 1B release in turn and the auxiliary line circuit restores to normal.

*Auxiliary line circuit used for calling alarm receiving station*

Let it be assumed now that an alarm condition occurs at station 101 (FIG. 3) causing alarm 104 to connect ground to tip 106 and ring 105; this results in operation of relays 1A and 1L over a path from battery, upper winding of relay 1A, left-hand winding of relay 1L to ground on tip 106 at the subscriber's station. Operation of relay 1A causes operation in turn of relays 1SF and 1SFA over paths previously described.

Relay 1L, operated, completes an operating path for relay 1TR traced from battery, winding of relay 1TR, make contact 1L–1 of relay 1L to ground. Relay 1TR upon operating opens the tip and ring of the line at its break contacts 1TR–1 and 1TR–3, connects tip 106 through the left-hand winding of relay 1L and make contact 1TR–4 of relay 1TR to capacitor 1CR1 (the shunt path through break contact 1TR–11 of the relay now being open), and connects ring 105 through make contact 1TR–5 of relay 1TR, right-hand winding of relay 1L and make contact 1TR–6 of relay 1TR to capacitor 1CT1 (the previous connection to ring 107 being open at break contact 1TR–2 of relay 1TR). Relay 1A releases when the line is opened at break contacts 1TR–1 and 1TR–3 of relay 1TR as mentioned above.

Relay 1TR, operated, also completes an operating path for relay 1L1 traced from battery, right-hand winding of relay 1L1, make contact 1TR–4 of relay 1TR, left-hand winding of relay 1L to ground on tip 106 at the subscriber's station, and holds relay 1L operated over this path just traced.

Relay 1L1 by its operation connects ground through resistor 131, break contact 1SA–6 of relay 1SA, make contact 1L1–2 of relay 1L1, the normally made pulsing contacts of the automatic call transmitter (not shown in detail here but see FIG. 2), lead 132, make contact 1TR–7 of relay 1TR and over the ring lead to the line link frame of the automatic switching system as an indication that a register should be connected. (As previously pointed out it is assumed for purposes of description that the automatic switching system is of the crossbar type.)

When a register is connected, ground is connected to S lead 118 and relay 1S operates. Operation of relay 1S in turn results in operation of relays 1SA and 1SA1; operation of relay 1SA1 completes an operating path for relay 1B traced from battery, winding of relay 1B, make contact 1SA1–4 of relay 1SA1, make contact 1SFA–3 of relay 1SFA to ground; relay 1B upon operating locks up on a path through its make contact 1B–3.

When the register is ready to receive pulsing, ground is connected from the automatic switching system to the tip lead and battery is connected to the ring lead; relay 1SP thereupon operates over a path from battery on the ring lead, make contact 1TR–7 of relay 1TR, lead 132, normally made pulsing contacts of the automatic call transmitter (FIG. 2), lead 134, winding of relay 1SP, make contact 1L1–1 of relay 1L1, make contact 1TR–8 of relay 1TR, to ground on the tip lead.

Relay 1SP, operated, completes an operating path for relay 1ST traced from battery, operating winding of relay 1ST, break contact 1C–1 of relay 1C, make contact 1SP–1 of relay 1SP to ground. Relay 1ST upon operating holds under control of relay 1C over a path including its own make contact 1ST–2. Operation of relay 1ST, in turn, completes an operating path for relay 1RP traced from battery, winding of relay 1RP, make contact 1ST–1 of relay 1ST to ground and a similar operating path for relay 1RP1 also including make contact 1ST–1. Operation of relays 1RP and 1RP1 closes at their respective make contacts 1RP–1 and 1RP1–1 the energizing circuit for the motor of the automatic call transmitter which is shown in detail in FIG. 2 and which was described previously in connection with that figure. The call transmitter is set to pulse into the automatic switching system, only the number of alarm receiving station 113 (FIG. 3). This pulsing takes place in the manner described in detail in reference to FIG. 2; before pulsing starts, however, relay 1BL operates (see description of the operation of the corresponding relay BL in connection with FIG. 2) connecting, at its 1BL–4 make contact, resistor 1AR in parallel with the winding of relay 1SP and completing an operating path for relay 1C traced from battery, winding of relay 1C, break contact 1CO–1 of relay 1CO, make contact 1BL–1 of relay 1BL to ground. Operation of relay 1C interrupts at its break contact 1C–1 the holding path of relay 1ST which releases. Relays 1RP and 1RP1 do not release upon the release of relay 1ST, however, since a holding path is established upon the operation of relay 1BL through its make contact 1BL–2. During pulsing a short is placed across the winding of relay 1SP by make contact 1S2–1 of blanking relay 1S2 of the automatic pulser (relay 1S2 is not shown but corresponds to blanking relay S2 of FIG. 2).

Upon completion of the pulsing operation, relay 1BL releases which in turn releases relays 1RP and 1RP1 and opens the energizing circuit for the automatic call transmitter. Relay 1C does not release upon the release of relay 1BL, however, since it is held operated over a path to ground through it own make contact 1C–2 and make contact 1L1–2 of relay 1L1.

The register passes the pulsed number to the marker so that the call can be completed to alarm receiving station 113, and then disconnects thereby releasing relay 1S. After the marker has established linkages to the called station in the normal fashion, ground is again connected to S lead 118 and relay 1S reoperates. This reoperates relays 1SA and 1SA1 (if released) and ringing is applied to the line at alarm receiving station 113 (FIG. 3) as an indication that there is trouble at subscriber's station 101.

Relay 1RP, when released as above described, removes the short (through resistor 1CR and make contact 1RP–2 of relay 1RP to ground) from capacitor 1CC, thus allowing the capacitor to charge from 130-volt sources 133 over a path including resistor 1JR, break contact 1RP–3 of relay 1RP, winding of relay 1CO, make contact 1C–3 of relay 1C, resistor 1DR, to capacitor 1CC and to ground.

In the time fixed by the characteristics of the circuit components, for example one minute, capacitor 1CC will be charged to the breakdown voltage of the gas-filled tube 1COT, and the tube will fire permitting conduction across the main gap. When this occurs, relay 1CO operates over a path from 130-volt source 133, resistor 1JR, break contact 1RP–3 of relay 1RP, winding of relay 1CO, lead 136, main gap of tube 1COT, lead 137, variable resistor 1HR, make contact 1C–4 of relay 1C, to ground. (The resistance of resistor 1KR is too great to permit the operation of relay 1CO therethrough to ground.) Relay 1CO, upon operating, locks up over a path to ground through its make contact 1CO–3 and make contact 1B–4 of relay 1B.

If in approximately one minute (that is the time assumed above for capacitor 1CC to charge) after the completion of pulsing, the switching equipment is unable to complete the call to alarm receiving station 113 (FIG. 3) due, for example, to a line-busy or an overflow condition or that the call has not been "recognized" at the receiving station, the timing circuit will function as above described, operating relay 1CO and causing the auxiliary line circuit to release the connection as described subsequently. The circuit then "recycles", also as subsequently described, to again attempt to complete the call and will continue its attempts until the call has been completed.

Relay 1CO, upon operating, interrupts at its 1CO–1 break contact the operating path for relay 1C which thereupon releases. The relay 1CO, operated, also opens at its 1CO–4 and 1CO–5 break contacts the connection of the tip 106 and ring 105 leads to the line link frame of the automatic switching system, thereby causing the connected trunk to release. When the connected trunk releases ground is removed from S lead 118 causing relay 1S to release. Release of relay 1S causes in turn the release of relays 1SA; 1SA1 and 1SFA. Relay 1SFA, released, opens at its 1SFA–3 make contact the holding path for relay 1B, which releases. Release of relay 1B, in turn, opens at its 1B–4 make contact the holding path for relay 1CO which thereupon releases.

Relays 1L, 1L1 and 1TR remain operated under control of the alarm ground at station 101 (FIG. 3) over the operating paths previously described. Relay 1CO, upon releasing, reconnects at its break contacts 1CO–4 and 1CO–5 the tip and ring conductors to the line link frame. Ground connected through resistor 131, break contact 1SA–6 of relay 1SA, make contact 1L1–2 of relay 1L1, the normally made pulsing contacts of the automatic call transmitter (shown in FIG. 2) lead 132, make contact 1TR–7 of relay 1TR, break contact 1CO–5 of relay 1CO and over the ring lead 105 to the automatic switching system causes the equipment to again try to complete the call in the manner described in detail above. This recycling will continue until the call is "recognized" at the alarm receiving station.

In order to "recognize," or answer the alarm indication at the alarm receiving station 113, the attendant must remove his receiver from the switchhook and remain "off-hook" for several seconds before replacing the receiver on the switchhook, it being assumed that this is done before relay 1CO has operated as described above. This causes the connected trunk to release under control of the terminating end, and ground is removed from S lead 118 causing relay 1S to release. Release of relay 1S causes in turn the release of relays 1SA; 1SA1; and 1SFA as described above. Release of relay 1SFA opens the holding path of relay 1B which, however, is slow-to-release.

Relay 1D operates (before relay 1B has released) over a path from battery, winding of relay 1D, make contact 1TR–9 of relay 1TR, break contact 1CO–6 of relay 1CO, make contact 1B–5 of relay 1B, break contact 1SFA–6 of relay 1SFA to ground. Relay 1D, upon operating, locks through its 1D–3 make contact to the alarm ground at station 101, opens the tip 106 and ring 105 at its break contacts 1D–1 and 1D–2 thereby releasing relays 1L and 1L1, and connects ground at its 1D–5 make contact to ring 105.

Relay 1L upon releasing opens, at its 1L–1 make contact, the operating path for relay 1TR, which thereupon releases, and relay 1L1 upon releasing opens, at its 1L1–2 make contact, the holding path for relay 1C, which thereupon releases. Relay 1D, however, remains operated over the path described above until the alarm contact 104 (FIG. 3) at the dial station 101 is restored to normal and ground removed from the line conductors.

While certain specific embodiments of the invention have been selected for detailed description, the invention is not, of course, limited in its application to the embodiments described. The embodiments which have been described should be taken as illustrative rather than restrictive thereof.

What is claimed is:

1. In a telephone system, a first subscriber's station and a second subscriber's station, means for establishing a connection between said two stations under normal conditions, means at the first of said stations for indicating an abnormal condition, an auxiliary connecting path, an automatic pulser associated with said auxiliary path and operable to pulse the number of the second of said stations only, means effective upon operation of said indicating means for disconnecting said first station from said first connecting means and for connecting it to said auxiliary connecting path and for operating said pulser to transmit into said auxiliary connecting path the number of said second station, thereby to complete an alternative connection between said two stations.

2. In a telephone system, a first subscriber's station and a second subscriber's station, a central office, a private line directly connecting said stations through said central office, an automatic telephone switching system, an auxiliary line circuit at said central office, an automatic pulser associated with said auxiliary line circuit and operable to pulse the number of said second subscriber's station only, means at said central office for disconnecting said first station from said private line and for connecting it through said auxiliary line circuit to said automatic telephone switching system, and means effective after connection of said first station to said automatic telephone switching system for operating said pulser to transmit the number of said other station to said switching system, thereby to cause said switching system to complete a connection between said two stations.

3. In a telephone system, a first subscriber's station and a second subscriber's station, a central office, a private line directly connecting said stations through said central office, an automatic telephone switching system, an auxiliary line circuit at said central office connected to said automatic telephone switching system, an automatic pulser connected to said auxiliary line circuit and operable to pulse the number of said second subscriber's station only, means at said central office for disconnecting said first station from said private line and for connecting it through said auxiliary line circuit to said automatic telephone switching system, means at said first subscriber's station for causing operation of said last previously mentioned means, and means effective after connection of said first station to said automatic telephone switching system for operating said pulser to transmit the number of said second station to said switching system, thereby to cause said switching system to complete a connection between said two stations.

4. In a telephone system, a first subscriber's station and a second subscriber's station, a central office, a private line directly connecting said stations through said central office, an automatic telephone switching system, an auxiliary line circuit at said central office connected to said automatic telephone switching system, an automatic pulser connected to said auxiliary line circuit and operable to pulse the number of said second subscriber's station only, means at said central office for disconnecting said first station from said private line and for connecting it through said auxiliary line circuit to said automatic telephone switching system, means at said first subscriber's station for causing operation of said last previously mentioned means, and means effective after connection of said first station to said automatic telephone switching system for operating said pulser to transmit the number of said second station to said switching system, thereby to cause said switching system to complete a connection between said two stations, said means at the first subscriber's station including a switch effective when operated to connect ground to one side of the line at the subscriber's station.

5. In a telephone system, a first subscriber's station and a second subscriber's station, a central office, means for establishing a connection through said central office between said two stations under normal conditions, means at the first of said stations for applying ground to the line as indication of an abnormal condition, an auxiliary connecting path at said central office, an automatic pulser connected to said auxiliary connecting path and operable to pulse the number of said second station only, means at said central office effective upon operation of said indicating means at the first station for disconnecting said first station from said first connecting means and for connecting it to said auxiliary connecting path and for operating said pulser to transmit into said auxiliary connecting path the number of said second station, thereby to complete an alternative connection between said two stations.

6. In a telephone system, a first subscriber's station and a second subscriber's station, a central office, a private line directly connecting said two stations through said central office, an automatic telephone switching system, an auxiliary path at said central office connected between said private line and the automatic telephone switching system, means at said central office for normally maintaining said auxiliary path in open-circuit condition, an automatic pulser connected to said auxiliary path and operable to pulse the number of said second station only, means at the central office for changing said auxiliary path to closed-circuit condition and at the same time opening the private line circuit thereby to transfer said first subscriber's station from the private line to said auxiliary path and therethrough to said automatic telephone switching system, means at said first station for causing operation of said changing means at the central office, and means effective following operation of said changing means for operating said pulser to transmit the number of said second station to said switching system, thereby to cause said switching system to complete a connection between said two stations.

7. In telephone system, a first subscriber's station and a second subscriber's station, a central office, a private line directly connecting said two stations through said central office, an automatic telephone switching system, an auxiliary path at said central office connected between said private line and the automatic telephone switching system, means at said central office for normally maintaining said auxiliary path in open-circuit condition, an automatic pulser connected to said auxiliary path and operable to pulse the number of said second station only, means at the central office for changing said auxiliary path to closed-circuit condition and at the same time opening the private line circuit thereby to transfer said first subscriber's station from the private line to said auxiliary path and therethrough to said automatic telephone switching system, means at said first station for causing operation of said changing means at the central office, and means effective following operation of said changing means for operating said pulser to transmit the number of said second station to said switching system, thereby to cause said switching system to complete a connection between said two stations, said means at said first station including a switch for connecting ground to the line at said station.

References Cited in the file of this patent

UNITED STATES PATENTS

| | | |
|---|---|---|
| 1,507,144 | Valette | Sept. 2, 1924 |
| 1,956,360 | Obergfell | Apr. 4, 1934 |
| 2,542,880 | Ravera | Feb. 20, 1951 |